(12) United States Patent
Pisetski et al.

(10) Patent No.: US 6,498,989 B1
(45) Date of Patent: Dec. 24, 2002

(54) METHOD FOR PREDICTING DYNAMIC PARAMETERS OF FLUIDS IN A SUBTERRANEAN RESERVOIR

(75) Inventors: Vladimir Pisetski, Ekaterinburg (RU); Valeri B. Kormilcev, Ekaterinburg (RU); Aleksander N. Ratushnak, Ekaterinburg (RU)

(73) Assignee: Trans Seismic International, Inc., Los Angeles, CA (US)

( * ) Notice: Subject to any disclaimer, the term of this patent is extended or adjusted under 35 U.S.C. 154(b) by 0 days.

(21) Appl. No.: 09/453,158

(22) Filed: Dec. 1, 1999

Related U.S. Application Data

(63) Continuation-in-part of application No. 09/134,616, filed on Aug. 14, 1998, now Pat. No. 6,028,820, which is a continuation-in-part of application No. 08/909,454, filed on Aug. 11, 1997, now Pat. No. 5,796,678.

(51) Int. Cl.$^7$ .............................................. G06F 19/00
(52) U.S. Cl. ............................................. 702/14; 703/8
(58) Field of Search .............................. 367/38, 25, 37; 702/6, 30, 7, 14; 395/500.31; 703/8

(56) References Cited

U.S. PATENT DOCUMENTS

| | | | | |
|---|---|---|---|---|
| 5,796,678 A | * | 8/1998 | Pisetski | 367/38 |
| 5,835,882 A | * | 11/1998 | Vienot et al. | 702/7 |
| 6,028,820 A | * | 2/2000 | Pisetski | 367/38 |
| 6,038,389 A | * | 3/2000 | Rahon et al. | 39/500.31 |
| 6,108,608 A | * | 8/2000 | Watts, III | 702/30 |
| 2001/0051854 A1 | * | 12/2001 | Lailly et al. | 702/14 |

OTHER PUBLICATIONS

Jay Byerlee, Friction of Rocks, 1968, pp. 615–626, Pageogh, vol. 116 (1978).
James D. Byerlee, Frictional Characteristics of Granite under High Confining Pressure, Jul. 13, 1967, pp. 3639–3648, Journal of Geophysical Rexearch vol. 72, No. 14.

* cited by examiner

Primary Examiner—Edward Lefkowitz
Assistant Examiner—Victor J. Taylor
(74) Attorney, Agent, or Firm—Reidlaw, L.L.C.; John S. Reid

(57) ABSTRACT

A method for determining the location of the accumulation fluids in a subterranean formation. The method includes the steps of determining a first velocity vector "$V_x$" for migration of fluid in a region of interest in the subterranean formation. The first velocity vector includes attributes of speed and direction of flow of fluid in a first direction in the region of interest. The method further includes determining a second velocity vector "$V_y$" for migration of fluid in the region of interest. The second velocity vector includes attributes of speed and direction of flow of fluid in a second direction in the region of interest. The velocity vectors are then extrapolated to identify the fluid accumulation location. The first and second velocity vectors are primarily functions of supplementary pressure "dP" in the region of interest, the permeability "c" of the region of interest, and the viscosity "u" of the fluid in the region of interest. The supplementary pressure can be determined by identifying pressure gradients within the region, the region being characterized by a seismic image of a stacked time section representing horizons within the region. The permeability of the media within the region, and the viscosity of the fluid within the region, can either be determined mathematically or from geological data.

8 Claims, 9 Drawing Sheets

(3 of 9 Drawing Sheet(s) Filed in Color)

a b

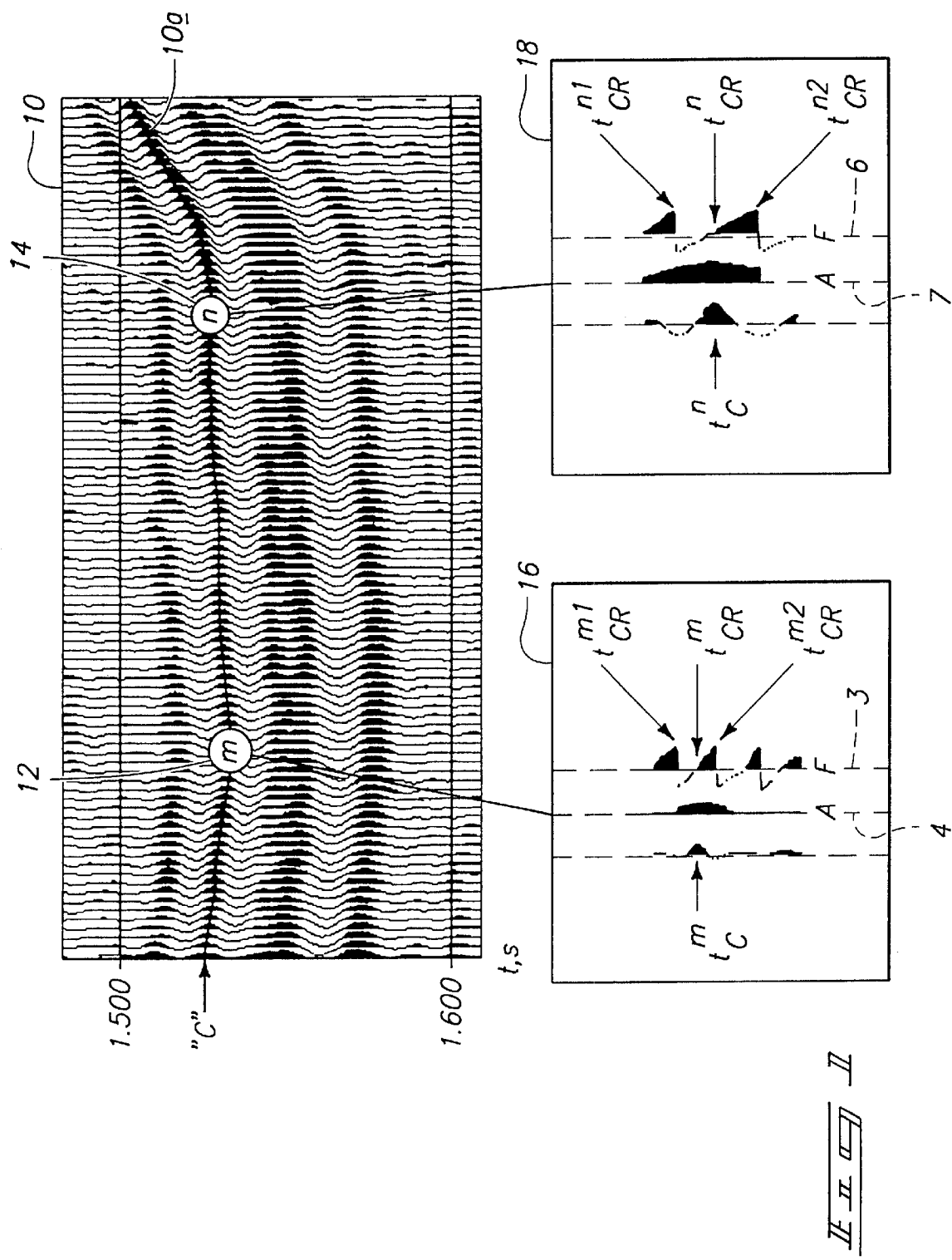

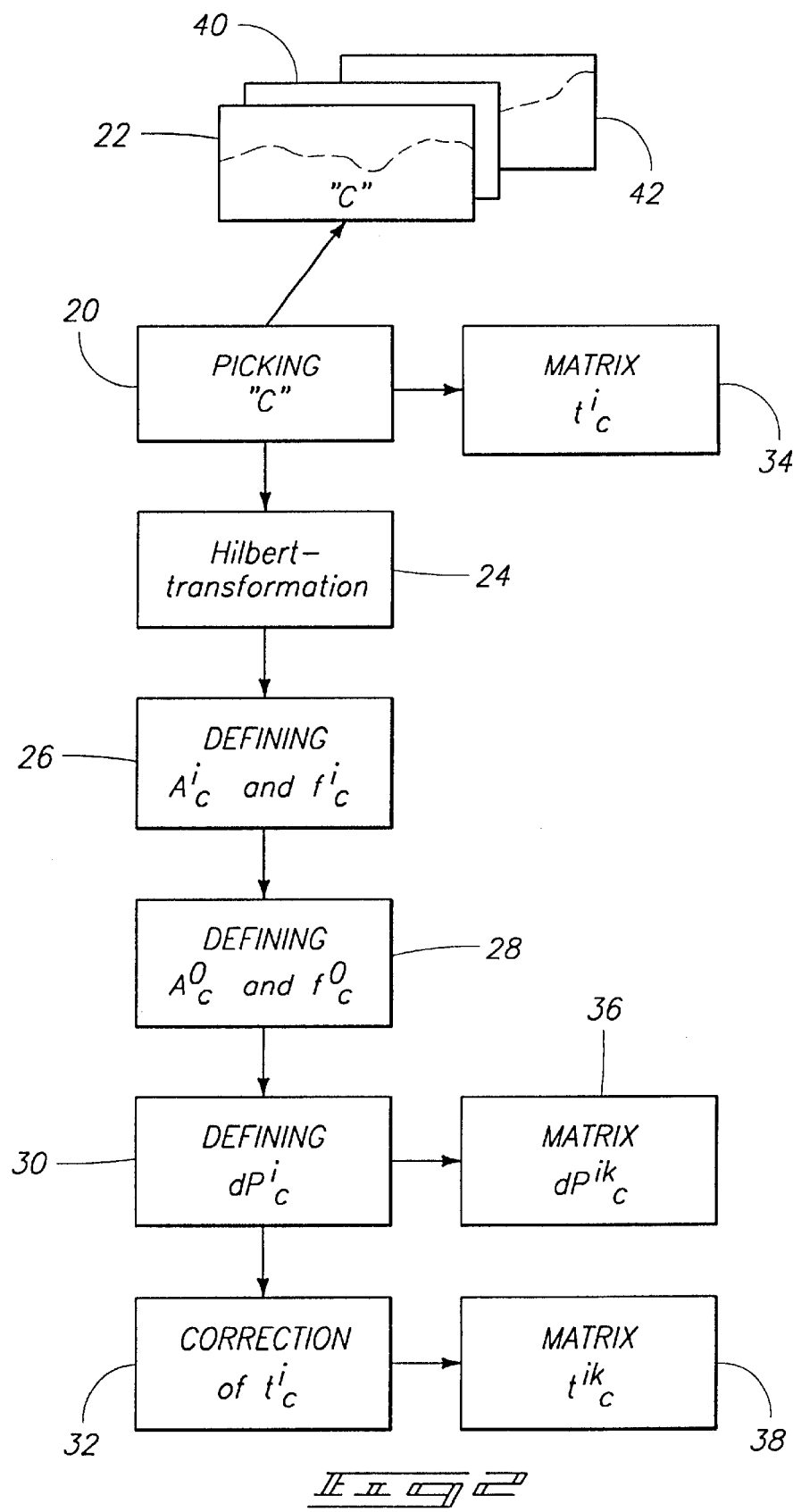

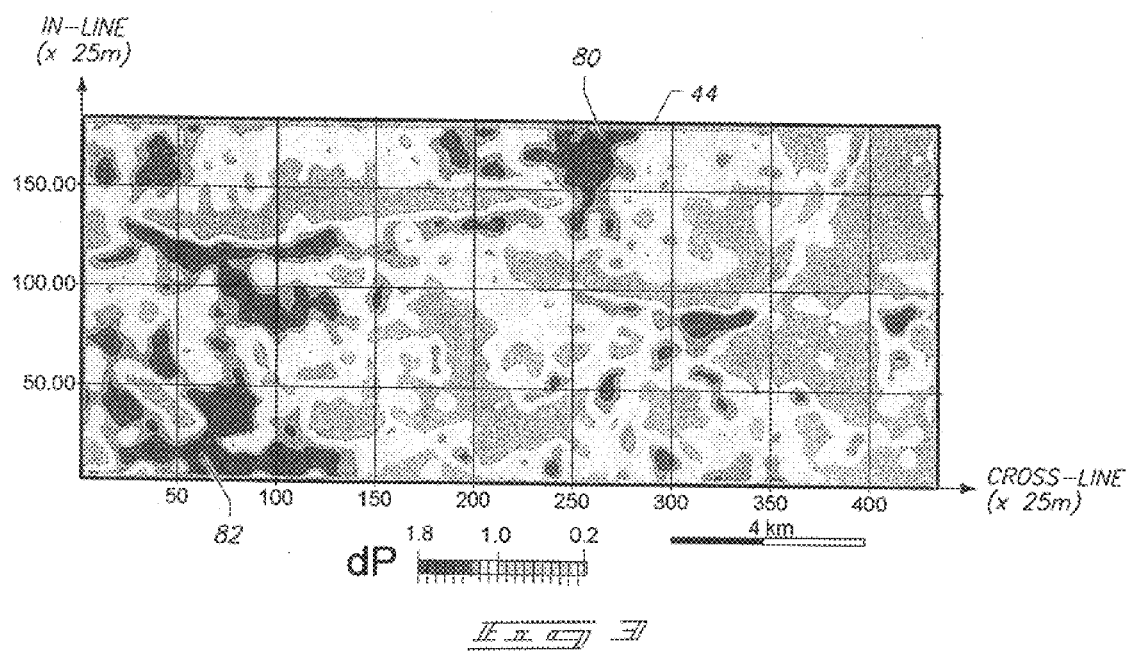

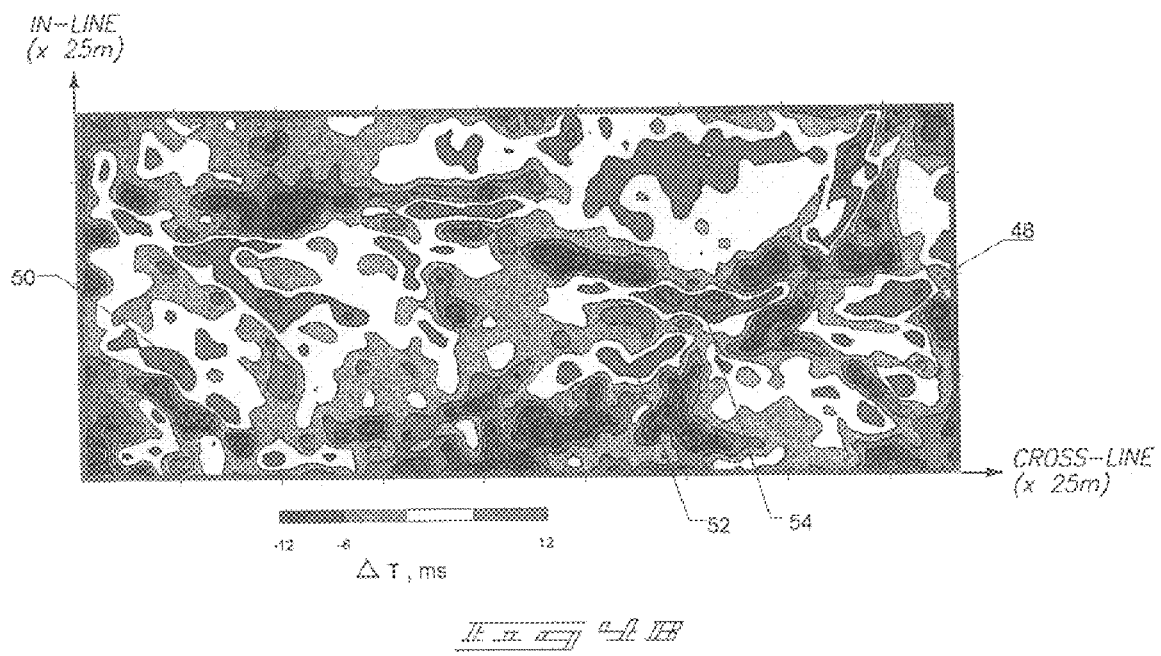

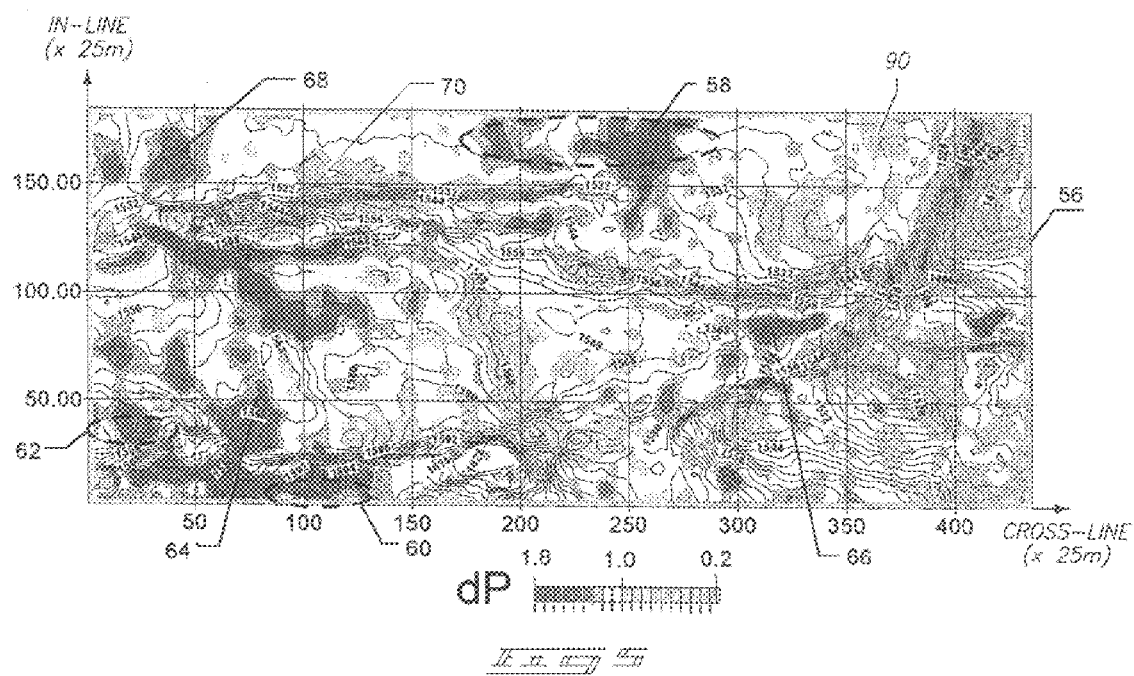

METHOD FOR PREDICTING DYNAMIC PARAMETERS OF FLUIDS IN A SUBTERRANEAN RESERVOIR

CROSS REFERENCE TO RELATED APPLICATION

This application is a Continuation in Part of U.S. patent application Ser. No. 09/134,616, filed Aug. 14, 1998, now U.S. Pat. No. 6,028,820 which is a Continuation in Part of U.S. patent application Ser. No. 08/909,454, filed Aug. 11, 1997, now U.S. Pat. No. 5,796,678, issued Aug. 18, 1998.

FIELD OF INVENTION

This invention pertains to a method for predicting the dynamic parameters of fluids in a subterranean reservoir.

BACKGROUND OF THE INVENTION

In the search for subterranean fluids (typically natural gas and/or petroleum), classical methods have used seismic imaging to generate an image of a subterranean region of exploration. Modem three dimensional (3D) seismic imaging has aided a great deal in developing credible models of the region of interest. Information regarding travel time of seismic signals can be used to estimate velocities of various subsurface layers, which provides information indicative of the rock type. Hydrocarbons are often trapped by geologic faults, and so the seismic images are subsequently interpreted to identify rock types which, in conjunction with geologic faults or other phenomenon, would result in an accumulation of fluids in an area in the region of study. However seismic information provides only limited information. Unless the geologic fault has a seal, fluids will not be trapped. Unfortunately, seismic survey data does not contain sufficient information to indicate the presence or absence of a seal. Other information is desirable which, if used in conjunction with seismic images, would improve the probability of finding hydrocarbons.

It is known that the field of so-called prestresses in the earth's crust is determined by two systems of external forces, namely, gravitational and tectonic forces. The joint action of these forces can result in compaction as well as in unloading of rock masses with respect to their normal gravitational or lithostatic stress condition. The existing theory describing stress fields in the earth's crust is absolutely correct for elastic and continuous media. At the same time information derived from a number of wells, drilled down to 10 km, points to the presence of fractures in sedimentary and crystalline parts of the earth's crust. Since there is little reason to expect presence of spatially localized fractures, we can affirm that any real rock unit is bounded by a closed system of fractures and represents a discrete system. Taking into account a well-known concept that any basin represents a tectonically young and consequently active structure, these are all reasons to consider any unit of the sedimentary cover as a part of discrete dynamic system. To date, no one has thought to use information pertaining to stress in the earth's crust as part of a method for determining the presence of fluid in a subterranean formation. Our invention uses seismic imaging information in conjunction with formation stress information to improve the reliability of seismic exploration for hydrocarbons.

The publication of J. D. Byerlee ("Friction of Rocks", *Pure Applied Geophysics*, 116 (1978), pp. 615–626) is useful for estimating parameters of stress condition of fractured and discrete rock units. He has found that the maximum differential stress (the difference of main stresses) in the upper part of the earths crust is limited by the shear strength of fractured rocks. Laboratory investigations show that the sliding friction on the surface of fractured rocks exists until the external load reaches the critical value of brittle failure. At the same time the strength of such a discrete rock unit is determined by cohesion of fractures on its surface and does not practically depend on the elastic moduli of the rock, temperature, strain value, and the type of sliding surface. It is determined that the cohesive force $\tau$ is a linear function of normal load $\sigma_n$ (Byerlee's law):

$$\tau = 0.85\sigma_n, \quad 3 < \sigma_n < 200 M\pi a \qquad (1)$$

or in the terms of main stresses, the limit value of horizontal stresses down to the depths of 5 km is estimated to be $$\sigma_1 \approx 5\sigma_3, \quad \sigma_3 < 110 M\pi a \qquad (2)$$

In other words the main component of stress condition variation in discrete media is associated with the change of vertical load. Insignificant movement in the base of a sedimentary basin (for example, in the crystalline basement) results in considerable change of the horizontal component of stress. The strength limit of a rock unit is rapidly reached, and all the sedimentary cover is set in motion continuously approaching the isostatic equilibrium. Thus, it is reasonable to suggest that real sedimentary formations have a high degree of mobility in vertical direction. As time of stress relaxation characteristic for discrete media is significant, the stress distribution in the basin has distinctive contrasting character and is governed by the principles of block dynamics. The most fundamental theoretical results in the field of elastic wave propagation in prestressed media were derived by M. A. Biot (textbook, *Mechanics of Incremental Deformations*, New York, 1965). Biot introduced a new type of strain, strain of solid rotation. Its introduction is related to non-hydrostatic character of prestress field in the medium (i.e. horizontal and vertical components of the stress field are not equal to each other). In this case each unit volume of the medium has been rotated through some angle with respect to its initial position in the unstressed medium. As a result additional strains appear in the wave field, and their amplitudes are directly proportional to the difference between horizontal and vertical components of the prestress field ($\sigma_1/\sigma_3$). A number of researchers studied the equations derived by M. A. Biot and came to the conclusion that the influence of initial stresses on traveltime and, especially, amplitude parameters of seismic waves, can be very significant, and the degree of this influence is proportional to the ratio $P/\mu$ (where P is pressure and $\mu$ is the shear modulus).

A significant number of publications are related to investigation of the stress condition of the earth with the aid of seismic methods. But practically all these investigations were based on the analysis of traveltime parameters and were reduced to attempts to explain complex distribution of velocity parameters by the influence of lithostatic pressure. In this case the stress condition of the subsurface is taken into account indirectly using theoretically and experimentally derived relationships between velocity and external load. In low-pressure regions the amplitudes and frequencies of the reflected signals completely depend on the density of fractures and the load applied to them. And the earth material (its elastic moduli) significantly influences the amplitude parameters of the signals only at the loads close to the strength limit of discrete media.

What is needed then is a method for improving the ability to discover hydrocarbons in a it st subterranean formation and which makes use of available data, an in particular seismic data which is likely to be collected as part of a exploratory effort in any event.

SUMMARY OF THE INVENTION

The presented invention has been developed as a method for seismic data interpretation targeted at discovery of the areas of the accumulations of the fluids. We have discovered a relationship between reflection coefficient and general rock pressure, which is the basis of our invention. It is assumed that the real sedimentary sequence is a discrete medium subjected to inhomogeneous stresses created by two types of the forces, namely gravitational and tectonic forces. As a result of a sum influence of these two forces, the basin, as a discrete system, is found in continuous movement or in the condition of inhomogeneous stresses. In correspondence with this point of view any stratigraphic sequence is found in different stress conditions in lateral direction, and consequently the amplitude and frequency parameters of reflected signals depend on the value of rock pressure acting on given element of a seismic reflector.

The first step of the developed interpretation method consists in tracking one or several target reflections along stacked time sections. A standard tracking procedure and standard 2D or 3D processing flows are used. The pressure gradients are found using picked travel times for tracked seismic horizons and by calculating parameters of Hillbert transformation (instantaneous amplitudes and phases) for each identified signal. The interpretation formula is directed to estimation of relative pressure changes under the assumption that the smoothed values of instantaneous amplitudes and derivatives of instantaneous phases (instantaneous frequency) correspond to general normal or gravitational pressure within all the study area, while all deviations from the average value represent relative estimates of anomalous pressures and correspond to local regions of decompression and compression.

The obtained map of relative pressure gradients is laid over the isochron map of a tracked horizon improved using the instantaneous phase picking. The principle of determining traveltimes more accurately consists in correction for signal frequency variation along the reflecting horizon in correspondence with the derived dependence of the frequency from pressure. The resulting map of relative pressure variation in combination with reflection time map represents the basis for identifying most probable locations of fluid accumulations. Localized region of anomalous unloading coincident with a closed or semi-closed time high is a physically valid area of hydrocarbon and water accumulation.

The information from the resulting map of relative pressure variation in combination with reflection time map can be further combined with classical seismic interpretation techniques to further enhance the prediction of the presence of fluids in a subterranean formation.

While the invention described herein is particularly useful for predicting the presence of fluid accumulations in a subterranean reservoir, the relationship between reflection coefficient and general rock pressure can also be used to predict rock pressure or pressure gradients within a subterranean formation. Such information can be useful in and of itself, for example, in the study and prediction of earthquakes.

The invention further includes a method for predicting the dynamic parameters of fluids in a subterranean reservoir. More specifically, the dynamic parameters of such fluids are determined by determining the relative estimate of the total ground pressure on the attributes of seismic signals related to a reflecting horizon, or any selected interval of the seismic section. This provides for a method for determining the location of the accumulation fluids in a subterranean formation. The method includes the steps of determining a first velocity vector "$V_x$" for migration of fluid in a region of interest in the subterranean formation. The first velocity vector includes attributes of speed and direction of flow of fluid in a first direction in the region of interest. The method further includes determining a second velocity vector "$V_y$" for migration of fluid in the region of interest. The second velocity vector includes attributes of speed and direction of flow of fluid in a second direction in the region of interest. The velocity vectors are then extrapolated to identify the fluid accumulation location. The first and second velocity vectors are primarily functions of supplementary pressure "dP" in the region of interest, the permeability "c" of the region of interest, and the viscosity "u" of the fluid in the region of interest.

The supplementary pressure can be determined by identifying pressure gradients within the region, the region being characterized by a seismic image of a stacked time section representing horizons within the region. The permeability of the media within the region, and the viscosity of the fluid within the region, can either be determined mathematically or from geological data.

In addition to the methods disclosed and described herein, our invention further includes computer apparatus for implementing the methods.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 1 illustrates the principle of relative pressure calculations for a given seismic horizon on a stacked time section.

FIG. 2 shows a flow chart of the method for calculating anomalous pressure estimates and corrections for reflection traveltime distortions using a set of stacked seismic sections processed with the aid of 3D techniques.

FIG. 3 is an example of anomalous pressure map for producing sandy-argillaceous Jurassic formation.

FIG. 4b shows a map of traveltime corrections for variation in signal frequencies along the reflection horizon.

FIG. 5 shows the final anomalous pressure map laid over isochron map and exploratory well locations.

DETAILED DESCRIPTION OF THE INVENTION

Figure 4A:
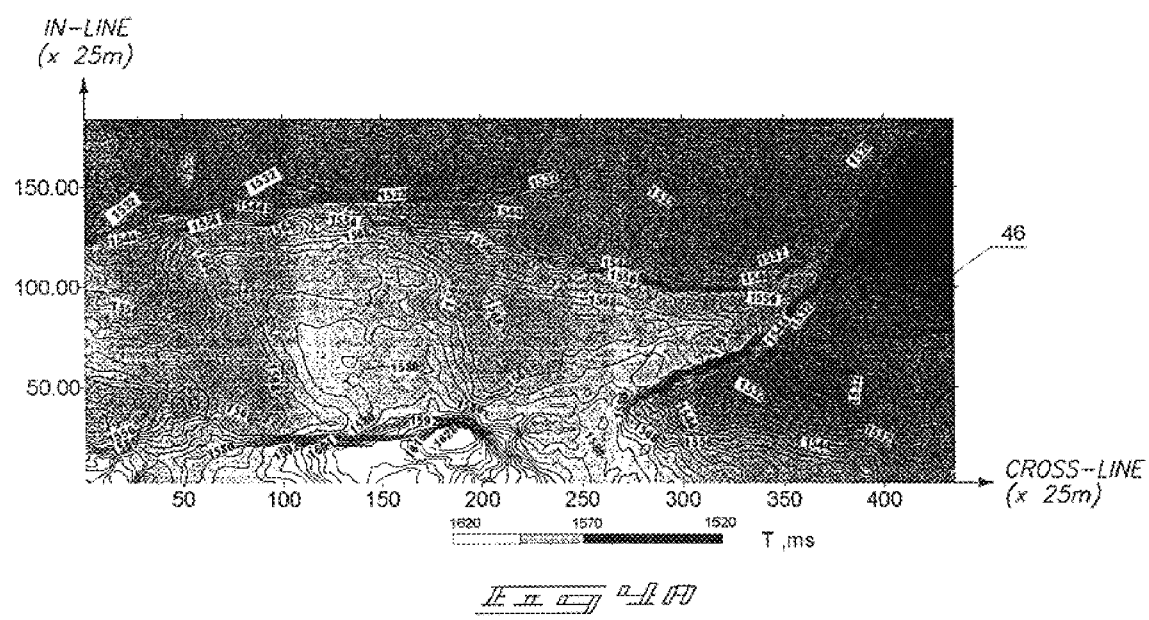
FIG. 4a shows an isochron map constructed using a standard technique of reflection horizon tracking.

Taking into account the information known which is discussed in the Background section above, we concluded that each layer or stratigraphic unit of a sedimentary basin is subjected to variable load along its extent. In one location the layer will have a high load (for example, equal to the normal lithostatic or gravitational pressure), while in the other location the load can be significantly lower, thus leading to the presence of a decompressed zone where reduction of general rock pressure is associated with fracture opening. Our invention makes use of this observation since one may predict what will happen to the fluid occupying the pore space of a continuous rock as well as interconnected system of fractures. That is, the fluid, particularly its light fractions, will migrate from the regions of relatively high pressure toward the decompressed zone, and if the closure conditions exist, accumulation and preservation of the accumulation of any type of fluid will take place. It should be noted that the presence of simple anticlinal structures is not necessary, and an accumulation can be formed in absolutely non-traditional conditions. The main factors in this case are the degree of discreteness of a given layer (the spatial density of fractures) and relative change in the general pressure.

Hence, we determined that if one knows the relative distribution of the general stress within all the sedimentary sequence or within its producing interval, it is possible to establish an objective criterion for discovering subsurface fluids' accumulations independently from all known structural and lithological conditions favorable for such accumulation. Seismic data is the primary source of information for making the stress condition estimate. At the same time all existing methods and techniques for seismic data interpretation are based on classical solutions to a wave equation for continuous and static media. In these solutions it is common to substitute stresses in initial wave equation by strains using the Hooke's law, i.e. using the elastic moduli. Therefore, the acoustic impedances or parameters derived from them are in practice the informative parameters for seismic data interpretation. But if the discrete dynamic model is used, the wave equation solution should be obtained for prestressed media, and the components of stress condition of real media are the target parameters. These parameters are of principal importance for exploring and discovering new oil and gas pools and water reserves as well as for planning their development.

Immediately following is a description containing the solution to a classical wave equation for a simple case of wave incidence on the interface between two half-spaces one of which is in prestress condition. We will now show our derivation of an expression for normal-incidence reflection coefficient for an elastic wave:

$$A_R = \frac{Z - Z^* + \Delta Z^* / \omega}{Z + Z^* + \Delta Z^* / \omega} \tag{3}$$

where $A_R$ is reflection coefficient, Z and $Z^*$ are acoustic impedances for unstressed half-space and prestressed half-space correspondingly, and $\omega$ is circular frequency, $$\Delta Z^* = PZ^* \omega / \mu^* \tag{4}$$

where P is a value proportional to non-hydrostatic pressure in the stressed half-space, and $\mu^*$ is shear modulus in the stressed medium.

Reflection and Refraction Coefficients for Plane Elastic Waves Propagating in a Prestressed Medium 1. Motion Equations The main law of dynamics F=ma has the following form for a continuous elastic medium:

$$\rho \frac{\partial^2 u_i}{\partial t^2} = \frac{\partial T_{ij}}{\partial x_j} \tag{a}$$

where stress tensor divergence in the right part of the formula is equal to the force acting on the unit volume of an elastic body subjected to internal dynamic stresses.

The generalized Hooke's law can be written as follows:

$$T_{ij} = c_{ijkl} S_{kl} = c_{ijkl} \frac{\partial u_l}{\partial x_k} \tag{b}$$

Here $c_{ijkl}$ is the tensor of elastic moduli. Substitution of the formula (b) into the equation (a) results in $$\rho \frac{\partial^2 u_i}{\partial t^2} = c_{ijkl} \frac{\partial^2 u_l}{\partial x_j \partial x_k} \tag{c}$$

For an isotropic solid body $$c_{ijkl} = \lambda \delta_{ij} \delta_{kl} + \mu(\delta_{ik}\delta_{jl} + \delta_{il}\delta_{jk}) \tag{d}$$

We then assume that an elastic medium is found under the condition of static prestress, caused by external forces, defectiveness of the medium, and other reasons. We further assume that prestresses are distributed in the medium continuously. In this case elastic wave propagation in a prestressed medium can be described as superposition of small dynamic strains to, in the general case, finite static strains. The linearized theory of elastic wave propagation in a prestressed medium is correct under this assumption, and consequently elastic waves can be described by equation (3) where the tensor of elastic moduli is given by $$c^{*0}{}_{ijkl} = c_{ijkl} + \sigma^0{}_{ij} \delta_{ik} \tag{e}$$

where $c^*{}_{ijkl}$ are effective elastic moduli describing response of a prestressed elastic medium to small dynamic loads, and $\sigma^0{}_{ij}$ is prestress tensor. By this means we have derived linearized motion equations for a prestressed elastic continuous medium in the form $$\rho \frac{\partial^2 u_i}{\partial t^2} = c^+_{ijkl} \frac{\partial^2 u_l}{\partial x_j \partial x_k} \tag{f}$$

2. Problem Formulation

If one considers two elastic half-spaces having a tight planar contact, the elastic moduli $c_{ijkl}$ of the lower half-space which is not subjected to prestresses differs from the elastic moduli of the upper half-space because of different composing materials. Besides, material of the upper half-space is prestressed and described by the prestress tensor $\sigma_{ij}$. In this way the elastic moduli of the upper half-space have the form (e). We then consider a plane wave incident on the interface from the lower half-space. Our problem then has the following formulation: it is required to determine propagation direction, polarization, and reflection and refraction amplitudes for known propagation direction, polarization, and amplitude of the incident wave and specified elastic moduli of both half-spaces.

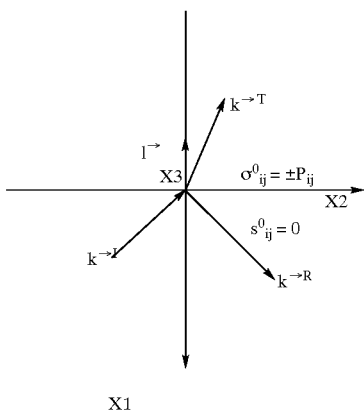

Boundary conditions for a tight contact require strain and stress continuity to be met at any moment of time and at any point of the contact surface specified in this case by the equation $lx=0$, where $l-$ is the vector normal to the contact surface, and $x-$ is coordinate in the contact plane $X_2OX_3$. The conditions of strain and stress continuity can be written as follows $$u_i^I + \sum_R u_i^R = \sum_T u_i^T \qquad (g)$$

$$T_i^I + \sum_R T_i^R = \sum_T T_i^T \qquad (h)$$

Here we use the following indices: I– for incident waves, R– for reflected waves, and T– for refracted waves.

We then consider the following type of monochromatic waves $$u_i = {}^0u_i e^{i(\omega t - \vec{k} \cdot \vec{x})} \qquad (i)$$

where ${}^0u_i = u_0 p_i$, $u_0-$ is wave amplitude, $p_i-$ is polarization vector.

The strain continuity condition (g) has the following form for the wave (i)

$$^0u_i^I \exp\{i(\omega^I t - \vec{k}^I \vec{x})\} + \sum_R {}^0u_i^R \exp\{i(\omega^R t - \vec{k}^R \vec{x})\} = \sum_T {}^0u_i^T \exp\{i(\omega^T t - \vec{k}^T \vec{x})\} \qquad (j)$$

It follows from the formula (j) that at any moment of time $$\omega^I = \omega^R = \omega^T \qquad (k)$$

and at any point of the contact surface $$k^I x = k^R x = k^T x \qquad (l)$$

We thus derive the following formulae from the equations (l)

$$(k^R - k^I)x = 0, \quad (k^T - k^I)x = 0$$

By comparison with the contact surface equation $lx=0$, one will see that the vectors $(k^R - k^I)$ and $(k^T - k^I)$ are perpendicular to the contact surface.

All of the wavenumber vectors lie in the incidence plane specified by the normal l and wavenumber vector $k^I$. Projections of all wavenumber vectors to the contact plane are equal to each other. We thus get $$k^R \sin \theta^R = k^T \sin \theta^T = k^I \sin \theta^I$$

Since the frequency content of the reflection wavelets is the same, the directions of wave propagation are determined from the following relations:

$$\sin \theta^R / V(\theta^R) = \sin \theta^T / V(\theta^T) = \sin \theta^I / V(\theta^I)$$

Now we derive simplified boundary conditions for strains from the formula (j)

$$^0u_i^I + \sum_R {}^0u_i^R = \sum_T {}^0u_i^T \qquad (m)$$

Substitution of the formula (9) into the Hooke's law (b) gives the following $$T_{ij} = -i c_{ijkl} {}^0u_k k_l \exp[i(\omega t - kx)]$$

The boundary conditions for stresses (h) now have the form $$c_{ijkl}[k_l^I {}^0u_k^I + \sum_R k_l^R {}^0u_k^R] = c^+_{ijkl} \sum_T k_l^T u^T_k \qquad (n)$$

Here the elastic moduli of stressed medium $C^+_{ijkl}$ are determined from the formula (e).

To simplify further our conclusions we assume that internal stresses determined by the initial stress tensor $\sigma^0_{ij}$ do not violate the medium isotropy, i.e. the tensor $\sigma^0_{ij}$ is isotropic: $\sigma^0_{ij} = \pm P \delta_{ij}$. Here P– is the tensor diagonal or a value proportional to the pressure (sign + corresponds to relief, and sign – corresponds to compression) in a stressed medium.

3. Particular Case of a Plane Shear Wave With Horizontal Polarization (SH-Wave).

For further conclusions we specify propagation direction and polarization of the incident wave. To simplify computations I select SH-wave as an incident wave. With this selection only two waves will appear the contact surface, i.e. reflected wave and refracted wave with the same polarization as that of the incident wave. So we have $$^0u_i = {}^0u p_i = {}^0u \delta_{i3}$$

for each wave. Substitution of this expression into (m) results in $$^0u^I + {}^0u^R = {}^0u^T \qquad (o)$$

Condition $l_j = -\delta_{j1}$ is satisfied for the normal l, and ${}^0u_k = {}^0u \delta_{k3}$ Now instead of (n) we derive $$c_{ij3l}[k_l^I {}^0u^I + k_l^R {}^0u^R] = c^+_{ij3l} k_l^T {}^0u^T \qquad (p)$$

Since wavenumber vectors lie in the plane defined by the normal l and the wavenumber vector $k^I$ of the incident wave, they have only two components (in the axes $X_1$ and $X_2$). By performing summation with respect to the index l we convert the expression (p) to $$c_{ij31}[k_1^I {}^0u^I + k_1^R {}^0u^R] + c_{ij32}[k_2^I {}^0u^I + k_2^R {}^0u^R] = c^+_{ij31} k_1^T {}^0u^T + c^+_{ij32} k_2^T {}^0u^T \qquad (q)$$

Taking into account our assumption about initial stress tensor isotropy ($\sigma^0_{ij} = \pm P \delta_{ij}$), we derive equation (4) into the following expression for the elastic moduli contained in equation (q)

$$c_{ij31} = \lambda \delta_{i1} \delta_{31} + \mu(\delta_{i3}\delta_{j1} + \delta_{j1}\delta_{i3})$$

$$c_{ij32} = \lambda \delta_{i1} \delta_{32} + \mu(\delta_{i3}\delta_{j2}\delta_{i2}\delta_{j3})$$

It can thus be seen from the latter that only the elastic modulus is not equal to zero for an isotropic medium. So instead of expression (q) we derive $$c_{3131}[k^I_1 {}^0u^I + k^R_1 {}^0u^R] = c^+_{3131} k^T_1 {}^0u^T \quad (r)$$

We now have a system of equations $$\begin{cases} {}^0u^I + {}^0u^R = {}^0u^T \\ c_{3131}[k^I_1 {}^0u^I + (k^R_1 {}^0u^R] = c^+_{3131}k^T_1 {}^0u^T \end{cases} \quad (s)$$

We next introduce the reflection and refraction coefficients by definition $$A_R \stackrel{def}{=} \frac{{}^0u^R}{{}^0u^I}$$

$$A_T \stackrel{def}{=} \frac{{}^0u^T}{{}^0u^I}$$

Then we have the following solution to the equation system (s)

$$A_T = A_R + 1 \quad (t)$$

$$A_R = \frac{c^+_{3131} k^T_1 - c_{3131} k^I_1}{c_{3131} k^R_1 - c^+_{3131} k^T_1} \quad (u)$$

Taking into account that $c_{3131} = \mu$ in an isotropic medium, and using the formula (e) and $\sigma^0{}_{ij} = \pm P\delta_{ij}$ we derive from (u)

$$A_R = A_R(P) = \frac{\mu^* k^T_1 - \mu k^I_1 \pm P k^T_1}{\mu k^R_1 - \mu^* k^T_1 \downarrow \pm P k^T_1} \quad (v)$$

By substituting $k^R{}_1 = -k^I{}_1 = k^I \cos\theta^I$, $k^T{}_1 = -k^T \cos\theta^T$ we obtain $$A_R = \frac{\mu k^I \cos\theta^I - (\mu^* \pm P) k^T \cos\theta^T}{\mu k^I \cos\theta^I + (\mu^* \downarrow \pm P) k^T \cos\theta^T} \quad (w)$$

After introduction of acoustic impedances of shear waves $Z_3 = \rho V_3$, $Z^*_3 = \rho^* V^*_3$, we obtain $$k\mu^I = \frac{\omega \mu}{V_3} = \frac{(\omega \rho(V_3))^2}{V_3} = \omega Z_3$$

$$k^T \mu^* = \omega Z^*_3$$

Introducing notation $$\Delta Z^* = P k^T$$

we finally obtain:

$$A_R = \frac{Z_3 \cos\theta^I - (Z^*_3 \pm \Delta Z^*/\omega)\cos\theta^T}{Z_3 \cos\theta^I + (Z^*_3 \downarrow \pm \Delta Z^*/\omega)\cos\theta^T} \quad (x)$$

The formulae (u)–(x) show that the reflection coefficient and consequently the refraction coefficient depend on the stress condition of the other half-space. Similar results can be obtained for compressional waves and for the case where both half-spaces are prestressed. Formulae for reflection coefficients for the said variants differ from the formula (x) only by constants.

Inventive Results of the Derivation: The Method and its Application

The expression (3) is different from the classical one by an additional member ($\Delta Z^*/\omega$) which depends on the difference between stress conditions of the upper and lower half-spaces. Taking into account the fact that in a discrete medium the elastic moduli have little effect on the changes in stress condition, the expression (3) can be rewritten in the form:

$$A_R = \frac{\Delta Z^*/\omega}{2Z + \Delta Z^*/\omega} \quad (5)$$

If we assume that the elastic moduli do not vary along given reflecting boundary, while pressure P varies, and the reflection coefficients in two points L and M of the reflecting boundary are given by $$\frac{A^L_R}{A^M_R} = \frac{\Delta Z^*_{L\omega M}(2Z + \Delta Z^*_{M/\omega M})}{\Delta Z^*_{M\omega L}(2Z + \Delta Z^*_{L/\omega L})} \quad (6)$$

Taking into account the expression (4) the formula (6) can be rewritten in the following form with accuracy up to a constant:

$$dP = \frac{P_L}{P_M} \approx \frac{(A^L_R)^a (\omega_M)^2}{(A^M_R)^a (\omega_L)^2}; \quad (7)$$

Where: a=2 for the media with high moduli (carbonate basins), and a=1 for the media with low moduli (terrogenous basins).

By this means the value dP is a relative estimate of pressure changeability along a seismic reflector. For a stacked time section the amplitude of signal is proportional to the reflection coefficient for given reflecting boundary, and we modify expression (7) to contain analytical signal parameters:

$$dP^L(t_i) = \frac{(a^L(t_i))^a (dF^0/dt)^2}{(a^0(t_i))^a (dF^L/dt)^2} \quad (8)$$

where $a(t) = (u^2(t) + v^2(t))^{1/2}$, $F(t) = \arctg(v(t)/u(t))$ is Hillbert transformation, and $a(t)$ and $dF/dt$ are instantaneous amplitudes and frequencies correspondingly. Instead of substitution of the parameters at the point M we use the following idea: amplitude parameters $a^0(t_i)$ and $dF^0/dt$ smoothed over the whole horizon represent a model of normal lithostatic pressure, or which is the same, "automatically" account for unknown elastic moduli of the medium.

We then apply expression (8) in the method for estimating pressure gradient on a stacked time section under the following assumptions:

$a^0(t_i)$ and $dF^0/dt$ are determined as average values of the instantaneous amplitudes and frequencies for the whole reflecting horizon or some its part taking into account little variability and influence of the elastic moduli of the rocks within a local part of the basin comparatively to the scale of sedimentary process, if dP(ti) is greater than unity, this indicates a reduction of the general pressure at a given point with respect to the average (normal or gravitational) pressure, which indicates a region of unloading, if dP(ti) is less than unity, this indicates an increase of the general pressure up to the normal (average) value or, which is less probable for discrete media, up to a value exceeding the normal pressure.

FIG. 1 illustrates the principle of calculating parameters used in the formula (8). Time section for the seismic line 10 is an example of standard 3D processing in the area of detailed exploration for oil. Graph 10a shows geometry of the tracked reflecting horizon "C" coincident with the top of producing stratigraphic sequence in the terrigenous basin (sandy-argillaceous Jurassic formations). The fragments 16 and 18 show intervals of two traces 2 (Tm) and 5 (Tn) corresponding to said horizon at the points 12 and 14. Also shown here are the results of Hillbert transformation of these traces: 4 and 7—instantaneous amplitude (A), and 3 and 6—instantaneous phase (F). The points $t^m{}_c$ and $t^n{}_c$ indicate position of the tracked horizon "C" after a standard picking procedure via the extrema of reflected wavelet.

To obtain stable values of parameters contained in the formula (8) the following steps are performed:

find a singular point on the phase curve F closest to the point $t^m{}_c$ (the curve F crosses zero at the point $t^m{}_{CR}$), find the previous singular point on the phase curve F closest to the point $t^m{}_{CR}$ (the curve F crosses value of 180 degrees at the point $t^{m_1}{}_{CR}$), find the following singular point on the phase curve F closest to the point $t^m{}_{CR}$ (the curve F crosses value of 180 degrees at the point $t^{m_2}{}_{CR}$/dt), in the time window specified as described above the normalized values of instantaneous amplitude and instantaneous frequency are given by $$A_C^m = \frac{\sum_{t_{CR}^{m_1}/dt}^{t_{CR}^{m_2}/dt} a_i}{(t_{CR}^{m_2} - t_{CR}^{m_1})/dt} \quad (9)$$

$$f_C^m = \frac{\sum_{t_{CR}^{m_1}/dt}^{t_{CR}^{m_2}/dt} (F_i - F_{i+1})/dt}{(t_{CR}^{m_2} - t_{CR}^{m_1})/dt} \quad (10)$$

* here dt is the trace sampling interval.

The parameters $A^m{}_C$ and $f^m{}_C$ are calculated for all points $t_c$ of the horizon "C" for a given section. As a result we obtain two sets of the normalized values of instantaneous amplitudes and frequencies and after that calculate average values of $A^0{}_c$ and $f^0{}_c$ using the following formulae:

$$A_C^0 = \left(\sum_{i=1}^k A_C^i\right)/k; \quad f_C^0 = \left(\sum_{i=1}^k f_c^i\right)/k \quad (11)$$

* here k is the number of traces in the seismic section.

Finally, use the formula (8) to determine pressure gradients (i.e. relative changeability of pressure) in each point of given horizon "C":

$$dP^i(t^i{}_C) = (A^i{}_C/A^0{}_C)^a (f^0{}_C/f^i{}_C)^2 \quad (12)$$

Assumedly the exponent "a" for a terrigenous basin is equal to unity. Finally we determine new values of $t^i{}_C$ corrected for variation in the frequency spectrum of reflected wavelets along the horizon "C". As is evident from the FIG. 1, the differences $\Delta tm = t^{m_1}{}_{CR} - t^m{}_{CR}$ and $\Delta tn = t^{n_1}{}_{CR} - t^n{}_{CR}$ for two traces 12 (m) and 14 (n) are not equal to each other because of difference in frequency content of the same reflection in two distant points of the tracked horizon. Consequently, all the values $t^i{}_C$ should be corrected as follows:

$$t^{i\ new}{}_C = t^i{}_C - 2(1/f^i{}_C - 1/f^0{}_C) \quad (13)$$

It should be appreciated that the map of pressure gradients which is generated using Eqn. 12, an example of which is shown in FIG. 3, can be of value in and of itself for identifying regions of differential rock pressure. Such can be used for example in the study of earthquakes, including predicting areas of likely seismic activity.

FIG. 2 represents the complete chart of the proposed seismic data interpretation method targeted at determining relative pressure estimates and locating oil and gas fields. Preferably the input data for the interpretation method are stacked time sections obtained as a result of standard 2D or 3D processing. In a first embodiment the interpretation scheme is applied to the results of 3D processing. The input data are, for example, the set of stacked time sections (gathered in.in-line or on-line direction) marked in the FIG. 2 by blocks 20, 40 and 42. The process, preferably, starts from the section 22. At first, a selected horizon is picked in manual or automatic mode using a generally accepted principle of tracking via the extrema of wavelets belonging to this horizon. The picked traveltimes $t^ic$ are, preferably, saved in the matrix 34 and transmitted to the following step 24 where the Hillbert transformation is preferably performed.

At the step 26, the picked traveltimes $t^ic$ are advantageously used to calculate normalized values of instantaneous amplitudes and frequencies $A^i{}_c$ and $f^i{}_c$ using the formulae (9) and (10). Then, at the step 28, we advantageously determine the average values $A^0{}_c$ and $f^0{}_c$ for obtained data sets. At the step 30, desired values of relative pressure changeability $dP^i$ are advantageously found and the obtained data set is preferably saved in the matrix 36. At the step 32 we advantageously determine corrections for signal frequency variability and correct the values $t^{i\ new}{}_c$ preferably using the formula (13). The corrected traveltime values are preferably saved in the matrix 38.

Then all the before mentioned steps are preferably applied to the section 40 and so on until the steps have been applied to all sections. When the last section (42) has been processed, we will Ii have filled matrices 34, 36, and 38, which can be used for generating the following maps: initial isochron map, pressure gradient map, and corrected isochron map. These maps are the basis for identifying the most probable locations of oil, gas, water and other fluid accumulations.

FIG. 3 shows a relative pressure changeability map (44) for the producing horizon "C". The map has been created using the described scheme for an oil field in the terrigenous basin. The regions of anomalously low relative pressure values, of which 80, 82 and 84 are representative, have been shaded red and represent a hydrocarbon indicator for fractured reservoirs in sandy-argillaceous Jurassic formations. The obtained result is then compared with the reflector geometry which is shown in FIGS. 4a and 4b.

FIG. 4a shows an isochron map for given horizon (fragment 46) and FIG. 4b shows a map of traveltime corrections dt c (fragment 48). Several positive anomalies of traveltime corrections can be seen in FIG. 4b. If we apply the traveltime corrections, new anticlinal structures (namely 50, 52, and 54) not previously detected on the results of standard horizon picking appear on the traveltime map. Vertical closures of the newly delineated structures are of 20–30 m, the value of great importance for the region of low-relief oil-bearing structures.

FIG. 5 shows final interpretation results: the relative pressure changes map (FIG. 3) has been laid over corrected isochron map shown in the FIG. 4a. The isochrons have been drawn as contours while the value of the relative pressure changeability estimates have been indicated using a color palette. The red shading (e.g., 58 and 68) corresponds to anomalously low values of changeability, while blue shading (e.g., 90) corresponds to normal lithostatic pressures.

Analysis of the map of FIG. 5 brings us to the following conclusions:

low-pressure regions (58, 60, 62, 64, 66, 68 and 70) are localized;

these regions coincide with highs on the isochron map of FIG. 4a;

the regions 58, 60, and 62 coincide with previously discovered oil fields which verifies the high quality and fidelity of our method for predicting the presence of fluid;

the regions 64, 66, 68 and 70 should be therefore recommended for exploratory drilling.

At the final step, the depth map for producing the horizon is advantageously constructed by implementing a standard time-to-depth conversion technique to the corrected isochron map (48). This map together with pressure estimates and recommended exploratory drilling locations can be used at the prospect evaluation stage as well as at the field development planning stage, because the estimates of relative pressures in the reservoir can have the key role while selecting methods and technologies of oil production, like in this particular case.

It is to be appreciated that the method described can, as suggested in the above paragraph, further include using classical, and future, discovered, seismic interpretation techniques in conjunction with the resulting pressure-isochron map. For example, classical seismic interpretation techniques are useful for identifying faults and traps which can cause fluids to accumulate in a subterranean reservoir. When an area of interest identified by the pressure-isochron map corresponds with the presence of a fluid trap, the likelihood that fluids are present in the identified area is increased.

The described methods are preferably performed using a computer. Thus, the invention further includes a computer configured to carry out the disclosed methods. The computer is configured to read a computer readable medium or computer memory which contains computer-executable steps for performing the steps of the method shown and described in the chart of FIG. 2. Generally, sets of computer-executable instructions for performing seismic data processing and generating resulting maps or seismic sections for interpretation are common in the industry, and in fact constitute the typical manner by which seismic methods are carried out. Examples of computer readable medium include a hard drive, a tape drive, a diskette, and ROM (read only memory) devices, such as a compact disk. Examples of computer readable memory include a hard drive and RAM (random access memory). As a result of performing the computer-executable steps on an appropriate input data set, the computer produces a product data set. The product data set can be outputted in the form of charts or graphs which are indicative of relative pressure changeability $dP^i$ of a subterranean region, pressure gradients in the region, corrected traveltime values $t^{i\ new}{}_C$ of the region, or any of the following maps: an initial isochron map, a pressure gradient map, a corrected isochron map, or an overlay of the relative pressure changeability map and the corrected isochron map. As indicated earlier, these maps are the basis for identifying the most probable locations of oil, gas, water and other fluid accumulations.

Method For Predicting The Dynamic Parameters Of Fluids In A Subterranean Reservoir It is known that oil and gas pools in a sedimentary basin are formed as a corollary of three main interconnected processes: generation, migration and accumulation. Existing technologies for studying reservoirs using geological and geophysical data to identify such oil and gas pools are targeted at detection of probable locations of fluid accumulation, known as "traps". Current methods for trap detection do not necessary lead to success in identifying such traps, however, due to many technical, geological, and other factors. However, we have developed a different approach to identifying traps having the probability of fluid presence, comprising estimation of the parameters of fluid flow or migration flow. Specifically, by determining the main parameters of the migration flow, for example its speed and direction, then the anomalous values of these parameters can correspond to the location of a trap. This method allows for the detection of traps where prior detection efforts, using attributes such as structural images of the reflecting interfaces and acoustic impedance, would be unsuccessful. The method of the present invention allows for parameters of migration flow to be determined by determining the relative estimate of the total ground pressure on the attributes of selected seismic signals.

The invention thus further includes a method for determining the relative estimate of the total ground pressure dP on the attributes of the seismic signals related to a reflecting horizon, or any selected interval of the seismic section. In terms of geodynamics in a subterranean reservoir or basin system in question, we start by assuming that:

$$P(T)=Pg\pm dP(T) \quad (\text{Eqn.}14)$$

where:

P(T)—is the total ground pressure at given depth and at given point in geological time;

Pg—is the normal lithostatic pressure; and dP(T)—is the supplementary pressure caused by the basin motion at the same point in geological time.

Thus, by obtaining a relative estimate of the total ground pressure dP(T) for a reflecting horizon using the seismic data, we then have a method for calculating the parameters $\vec{V}(T)$, c and $\mu$ on the basis of Equation (14) using certain assumptions about the model of the fracture-porous volume of the medium in the studied interval of the subsurface and the ratio of solid and liquid components of the total supplementary pressure dp(T).

Recognizing the generally accepted scheme of destruction of a sedimentary basin, we can assume that the response of a discrete medium to the basement movements caused by current geodynamics of the lithosphere is formed in a slowed rate in the form of a viscous flow. Consequently, we can make a principal assumption about the property of continuity of solid and liquid components of the total pressure and further consider dP(T) as over-hydrostatic pressure which we will notify as $P_d$.

This approach allows us to solve constructively the problem of fluid migration as applied to the geodynamic history of a basin's development. In this case the speed and direction of a fluid flow $\vec{V}$ are expressed in the following form in correspondence with Equation (14):

$$\vec{V}(T) = -(c/\mu)\nabla dP(T) \quad \text{(Eqn. 15)}$$

where:

V(T)—is the vector of the speed of the fluid flow;

c—is the permeability of the medium; and $\mu$—is the fluid viscosity.

Once we have obtained a relative estimate of the total ground pressure P(T) for one of reflecting horizons using the seismic data, then we can employ a method for finding the parameters $\vec{V}(T)$, c and $\mu$ using Equation (15) by making certain assumptions about the model of the fracture-porous volume of the medium in the studied interval of the subsurface. The derived set of the fluid-dynamic parameters of the reservoir within an oil or gas field will reflect the dynamic state of the fluid mixture at the time of determination of these parameters.

Figure 6:
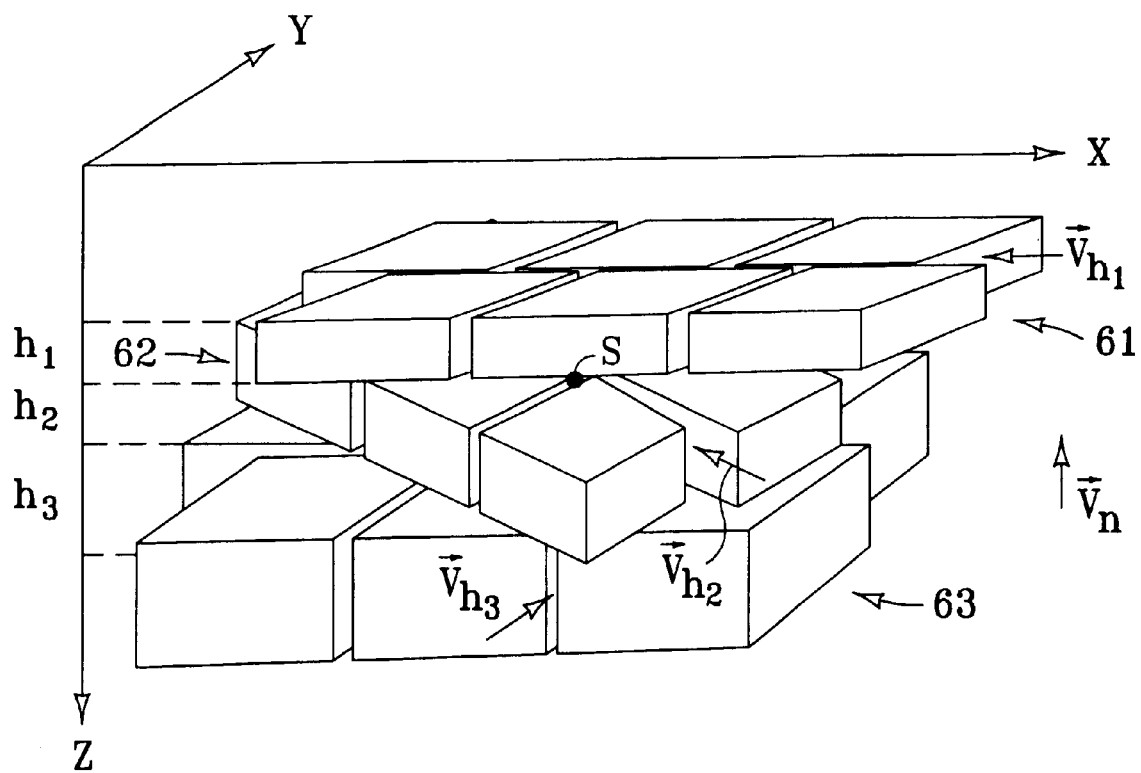
FIG. 6 depicts a three-layer model of the medium of a subterranean formation having discrete structure.

Some general peculiarities of fluid migration and permeability in a discrete system are depicted in FIG. 6. FIG. 6 shows a simple and most general variant of a composition of three formation units 61, 62 and 63 of low level ($B_L$), and each formation unit represents a layer composed of elementary blocks. It is supposed that the geometry and orientation of these blocks in layers can be arbitrary in the plane XY. In such a scheme the total permeability $c_i$ of each layer will be determined by several main factors:

The average value of the blocks' void interval in a horizontal direction ($m_v$)

The thickness of given layer (h).

The permeability of each block in a layer (block or so-called matrix permeability). And, The permeability of the upper and lower boundaries of a considered formation unit (boundary permeability. or hydrodynamic contact along the horizontal boundaries of formation units in the context of discrete medium). This permeability is conditionally determined by the structure of a contact plane with the vertical "thickness" $m_h$.

In a generally accepted scheme of determination of true fracture permeability it is assumed that the block and fracture voids compose a common hydrodynamic system where the model of Darcy's flow is true. The permeability of a composition of layers with block structure in the normal (i.e., vertical) direction will be significantly lower than in a horizontal direction, since the value of void interval between the layers (horizontal contact of the blocks), which we notified as $m_h$, is always considerably less than $m_v$. Intersections of the sides of the blocks belonging to adjacent layers (in separate points such as the point S in FIG. 6) also cannot significantly increase the vertical permeability of discrete rocks. Therefore, assuming some general direction of fluid flow exists, the speed and direction of the flow $\vec{V}$ will be different in each considered layer. That is, discrete systems possess an evident anisotropy of the fluid flow parameters, and consequently, the permeability in such systems is a tensor.

By analogy with a generally accepted representation of flow as a conductivity, we will consider such a thin anisotropic layer and define the continuity equation for an incompressible fluid with the viscosity $\mu$ as the initial one $$\nabla \vec{V} = 0 \quad \text{(Eqn. 16)}$$

Then, let:

$$\vec{V} = \frac{\hat{c}}{\mu}\nabla P_d = \frac{\hat{c}}{\mu}\left(\frac{\partial P_d}{\partial x}\vec{i} + \frac{\partial P_d}{\partial y}\vec{j}\right) \quad \text{(Eqn. 17)}$$

where $\hat{c}$ is the permeability tensor in the main axes:

$$\hat{c} = \begin{vmatrix} c_{xx} & 0 \\ 0 & c_{yy} \end{vmatrix} \quad \text{(Eqn. 18)}$$

Then from the continuity equation Eqn. (16):

$$\frac{\partial}{\partial x}\left(c_{xx}\frac{\partial P_d}{\partial x}\right) + \frac{\partial}{\partial y}\left(c_{yy}\frac{\partial P_d}{\partial y}\right) = c_{xx}\frac{\partial^2 P_d}{\partial x^2} + c_{yy}\frac{\partial^2 P_d}{\partial y^2} = 0 \quad \text{(Eqn. 19)}$$

Next we introduce the coordinates:

$$\xi = \frac{x}{\sqrt{c_{xx}}}; \quad \eta = \frac{y}{\sqrt{c_{yy}}}.$$

Then:

$$\frac{\partial^2 P_d}{\partial \xi^2} + \frac{\partial^2 P_d}{\partial \eta^2} = 0.$$

This gives us:

$$P_d = A\ln(\xi^2 + \eta^2) = A\ln\left(\frac{x^2}{c_{xx}} + \frac{y^2}{c_{yy}}\right) \quad \text{(Eqn. 20)}$$

The contours of equal pressure have the following form:

$$\frac{x^2}{c_{xx}} + \frac{y^2}{c_{yy}} = const$$

and are the ellipses with the ratio of semi-axes:

$$l^2 = \frac{c_{yy}}{c_{xx}}.$$

The constant A of Eqn. 20 we obtain from the expression:

$$Q = \int_l D_n \, dl \quad \text{(Eqn. 21)}$$

where l is the outline surrounding the region of the pressure source, and Q is flow rate of a fluid from the deformed region of small size Dn. From this we obtain the following results:

$$A = \frac{\mu Q}{4\pi\sqrt{c_{xx}c_{yy}}} \quad \text{(Eqn. 22)}$$

$$P_d = -\frac{\mu Q}{4\pi\sqrt{c_{xx}c_{xx}}}\ln\left(\frac{x^2}{c_{xx}} + \frac{y^2}{c_{yy}}\right) \quad \text{(Eqn. 23)}$$

$$V_x = -\frac{c_{xx}}{\mu}\frac{\partial P_d}{\partial x} = \frac{Q}{2\pi}\frac{1}{\sqrt{c_{xx}c_{yy}}}\frac{x}{\frac{x^2}{c_{xx}} + \frac{y^2}{c_{yy}}} \quad \text{(Eqn. 24)}$$

$$V_y = -\frac{c_{yy}}{\mu}\frac{\partial P_d}{\partial y} = \frac{Q}{2\pi}\frac{1}{\sqrt{c_{xx}c_{yy}}}\frac{y}{\frac{x^2}{c_{xx}}+\frac{y^2}{c_{yy}}}.$$ (Eqn. 25)

The vector of the flow speed $\vec{V}$ is directed radially.

$$\frac{V_{xx}}{V_{yy}} = \frac{x}{y}.$$

Then we have:

$$V_{x(y=0)} = \frac{1}{x}\frac{Q}{2\pi}\sqrt{\frac{c_{xx}}{c_{yy}}}; \quad V_{y(x=0)} = \frac{1}{y}\frac{Q}{2\pi}\sqrt{\frac{c_{yy}}{c_{xx}}}$$ (Eqn. 26)

And for the circle x=y we have:

$$\frac{V_{x(y=0)}}{V_{y(x=0)}} = \frac{c_{xx}}{c_{yy}}$$ (Eqn. 27)

Thus, it follows that the regions of higher permeability coincide with the regions of higher fluid speeds. But the pressure gradients are equal at $\phi=0$;

$$\varphi = \frac{\pi}{2};$$

$$\frac{\partial P_d}{\partial x}(y=0) = -\frac{1}{x}\frac{\mu Q}{2\pi}\frac{1}{\sqrt{c_{xx}c_{yy}}} \text{ and}$$ (Eqn. 28)

$$\frac{\partial Pd}{\partial y}(x=0) = -\frac{1}{y}\frac{\mu Q}{2\pi}\frac{1}{\sqrt{c_{xx}c_{yy}}}$$ (Eqn. 29)

Figure 7:
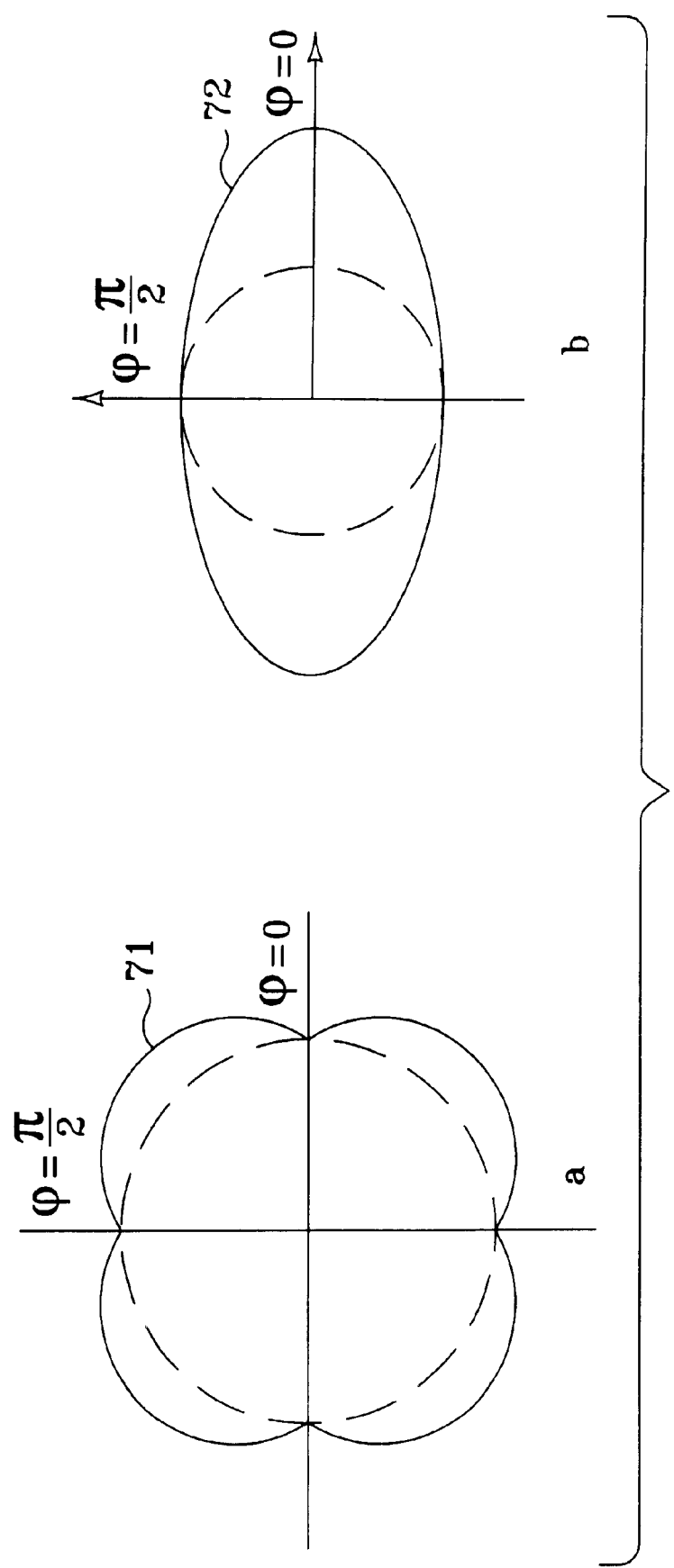
FIG. 7 depicts two qualitative graphs of the parameters of fluid flow in a thin discrete layer: graph "a" depicts pressure gradients in the presence of two-axis anisotropy; and graph "b"depicts pressure gradients in the presence of triaxial anisotropy.

It is therefore accurate to say that the pressure gradients are maximum when $\phi=\pi/4$. At any other $\phi$ the pressure gradients have lower values. Therefore, the circle diagram 71 for the pressure gradients have a form shown in FIG. 7(a). At the same time, in the presence of triaxial anisotropy, as shown in FIG. 6, we have a circular graph 72 for a certain plane passing through two main directions as depicted in FIG. 7(b). As applied to the considered problem of fluid flow in a discrete medium, the above description indicates that a real formation unit in the form of a discrete layer is characterized with the anisotropy of permeability and the ability to deviate the fluid flow from the initial direction and to change the rate of the fluid flow.

Next we consider the situation where the sources and drains of a fluid are formed in each unit volume of a discrete medium due to variation of the total voidness as a result of continuous change of the total ground pressure towards its increase (compression) or decrease (decompression). Then we have from the equation of continuity:

$$\frac{\partial}{\partial t}(Fr) + \nabla(rV) = 0.$$ (Eqn. 30)

For an incompressible fluid with a constant density $\rho$ it follows that $$\nabla V = -\frac{\partial F}{\partial t} = -q$$ (Eqn. 31)

where V is the speed of Darcy's flow, F is the total voidness (fracture-porous volume), and q is the rate of its change ($c^{-1}$). We will also accept that the rate of the volumetric deformation $\Delta D/\Delta t$ of a certain volume of the discrete medium D is related to the rate of change of the total voidness solely. That is:

$$q = \frac{\Delta D}{D\Delta t}$$ (Eqn. 32)

By substituting the expression for the speed of Darcy's flow $V=c/\mu$ grad $P_d$ in Eqn. (15), we obtain the Poisson's equation for pressure in the following form:

$$\nabla^2 P_d = -\frac{\mu}{c}\nabla\frac{c}{\mu}\nabla P_d + \frac{\mu}{c}q$$ (Eqn. 33)

In the case of a medium with a constant permeability $c_0$ and a homogeneous fluid with a viscosity $\mu_0$, we have:

$$\Delta P_d = -\frac{\mu_0 q}{c_0}$$

and $$P_0 = -\frac{\mu_0}{4\pi c_0}\int_{D_0}\frac{qdD_0}{R}$$ (Eqn. 34)

where $dD_0=dx_0 dy_0 dz_0$ is the volume being deformed.

The expression for the pressure in the presence of a heterogeneous region D, in which c and $\mu$ are the function of coordinates, can be written as:

$$P_d = P_0 - \frac{1}{4\pi}\int_D \left(\frac{c\mu_0}{c_0\mu} - 1\right)\nabla_D P_d \frac{r}{r^3}dD$$ (Eqn. 35)

where $r=(x-\xi)i+(y-\eta)j+(z-\zeta)k$, and $dD=d\xi d\eta d\zeta$.

Equations (34) and (35) can be directly generalized for the case of several deformed and heterogeneous regions, and the volumes D and $D_0$ can coincide partially or completely. If we assume that a small deformation does not cause a considerable displacement of the permeability boundaries of considered volumes, there are several deformed volumes $D_0=\Sigma D_{0j}$, j=1,2,3 . . . , n, and each volume $D_{0j}$ is characterized with its own rate of volumetric deformation $q_j$. The rate of volumetric deformation has different signs in the directions of compression and decompression of the volumes. Accordingly it is possible to construct the sedimentary cover in the form of considered model of a discrete dynamic system. In a given case the problem of a basin's dynamics is directly associated with the problem of variation of the medium permeability as a time function. This eventually leads to formation of absolutely natural communicating patterns of the blocks: one system of blocks squeezes the fluid out, while the other system of blocks absorbs it.

For regions sufficiently extensive along the axis OY in comparison with the dimensions along the other axes we can write the equation in two-dimensional case, similar to Equations (34) and (35), in the form:

$$P_d = \frac{\mu_0}{2\pi c_0} \int_{S_0} q \ln R \, dS_0 - \frac{1}{2\pi} \int_S \left(\frac{c\mu_0}{c_0\mu} - 1\right) \nabla_D P_d \frac{r}{r^2} dS. \quad \text{(Eqn. 36)}$$

The integral equation for the gradient of potential can be obtained for inner points of the cross-section S using Eqn. 36 as follows:

$$\nabla_A P_d = \frac{\mu_0}{2\pi c_0} \int_{S_0} q \frac{R}{R^2} dS_0 - \frac{1}{2\pi} \nabla_A \int_S \left(\frac{c\mu_0}{c_0\mu} - 1\right) \nabla_M P_d \frac{r}{r^2} dS \quad \text{(Eqn. 37)}$$

where: $\nabla_A = i\partial/\partial x + k\partial/\partial z$, $\nabla_D = i\partial/\partial \zeta + k\partial/\partial \zeta$, $dS = d\xi \partial \zeta$, $R = (x-x_0)i + (z-z_0)k$, $r = (x-\xi)i + (z-\zeta)k$, and $dS_0 = dx_0 dz_0$.

By solving the integral Equation (37) we can determine the pressure from Eqn. (36) using the same matrix of inner values $\nabla_D P_d$.

Now we will consider a thin horizontal layer located in a medium impermeable for a fluid. We will also superpose the regions of deformation and heterogeneity S and $S_0$. In this case Equations (36) and (37) should be written in the form $$P_d = \frac{1}{2\pi} \int_S \frac{\mu_0}{c_0} q \ln R \, dS - \frac{1}{2\pi} \int_S \left(\frac{c\mu_0}{c_0\mu} - 1\right) \nabla_M P_d \frac{r}{r^2} dS \quad \text{and} \quad \text{(Eqn. 38)}$$

$$\nabla_A P d = \frac{1}{2\pi} \int_S \frac{\mu_0}{c_0} q \frac{r}{r^2} dS - \frac{1}{2\pi} \nabla_A \int_S \left(\frac{c\mu_0}{c_0\mu} - 1\right) \nabla_M P_d \frac{r}{r^2} dS \quad \text{(Eqn. 39)}$$

where $\square_A = i\partial/\partial x + j\partial/\partial y$, $\nabla_M = i\partial/\partial \zeta + j\partial/\partial \eta$, $dS = d\xi \partial \eta$, and $r = (x-\xi)i + (y-\eta)k$.

After scalarization the vector integral Equation (39) can be considered as a system of integral equations of Fredholm of the second type, if the distribution $c/\mu$ is known and the pressure gradient should be calculated, as well as the equation of Fredholm of the first type for an unknown distribution $c/\mu$, if the distribution of the pressure gradient is specified. If the main target is evaluation of the correspondence between the pressure and the permeability, then it is proper to solve the direct problem of determining the pressure gradient on given distribution of the permeability by using Eqn. (39) as the Fredholm equation of the second type, and then to calculate the pressure using Eqn. (38).

Figure 8:
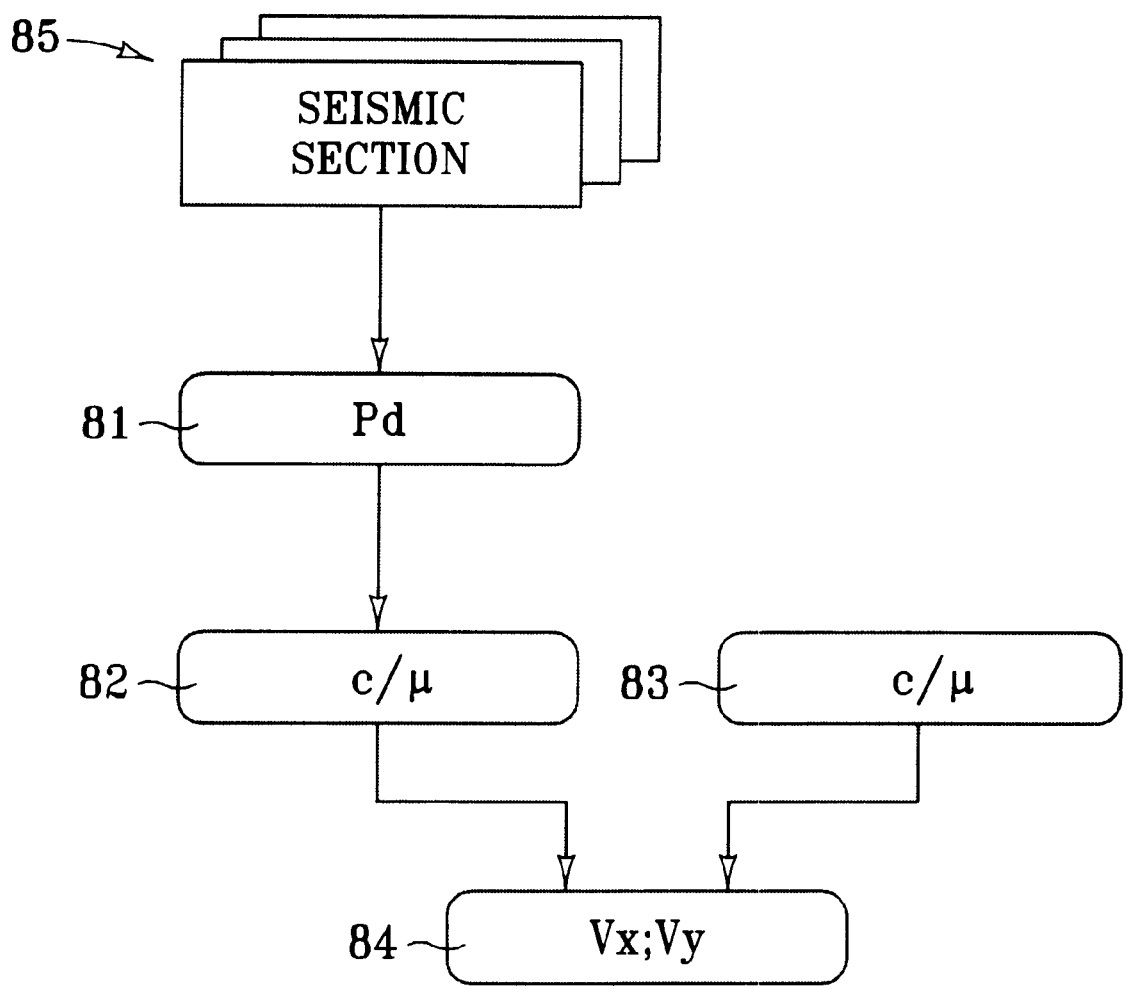
FIG. 8 depicts the method for determining the fluid-dynamic parameters on a seismic section.

From the practical point of view the general scheme of determination of the main fluid-dynamic parameters can be presented with the aid of a diagram shown in FIG. 8. With reference to FIG. 8, the initial information used to obtain a solution to the problem is the relative distribution of overhydrostatic pressure $P_d$ 81, which can be determined from the seismic attributes from the studied interval of a seismic section (2D–3D) 85 in the manner described in the first part of the above Detailed Description. Then, by solving Equation (39) with respect to an unknown distribution $c/\mu$, we can will derive c 82 in the same points and coordinates of the seismic section for a specified $\mu$ (for example, $\mu=1$). An alternative solution at this step can be obtained by specifying $c/\mu$ from geological data, if the location of the stratigraphic boundaries is known and the properties of rocks are determined on well data 83. At the final stage 84 the components Vx and Vy of the vector of fluid flow speed are derived in correspondence with the ratios from Eqn. (26) using known distributions $P_d$ and $c/\mu$. In given example the method supposes determination of the fluid-dynamic parameters on one seismic section and construction of a map in vertical plane (x—the direction of the seismic section; y—the vertical axis of time or depth). The same can be done for many seismic sections (i.e., a three-dimensional or 3D solution), and in this case horizon-oriented maps of target parameters are created for specified depths. The derived set of the fluid-dynamic parameters of the reservoir within an oil or gas field will reflect the dynamic state of fluid mixture at the time of determination of these parameters.

This method thus allows for the following information to be obtained:

1. To locate the regions with highest permeability within a reservoir, or the regions with anomalous deviations of the vector of fluid flow speed from the dominant direction. In both cases such regions can testify to the presence of hydrocarbon traps.
2. To delineate more accurately an oil or gas accumulation within the limits of given reservoir.
3. To determine the discrepancy between the new and the previous outlines of the accumulation in the case where its spatial location was known from the results of the previous investigations (seismic or other methods).
4. To optimally design the trajectory of the wellbore. This is of particular advantage for horizontal drilling since the highest productivity will be obtained in the situation where the axis of the wellbore is located at a certain angle to the direction of the maximum permeability $_c$, which is a tensor value in dynamic systems. And,
5. To optimally plan the development scheme for given field with account for the current and the future dynamics of the fluid mixture.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method for determining the location of the accumulation fluids in a subterranean formation, comprising:

determining a first velocity vector "$V_x$" for migration of fluid in a region of interest in the subterranean formation, the first velocity vector comprising attributes of speed and direction of flow of fluid in a first direction in the region of interest;

determining a second velocity vector "$V_y$" for migration of fluid In the region of interest, the second velocity vector comprising attributes of speed and direction of flow of fluid in a second direction in the region of interest;

extrapolating the velocity vectors to identify the fluid accumulation location; and wherein the first and second velocity vectors are primarily functions of supplementary pressure "dP" in the region of interest, the permeability "c" of the region of interest, and the viscosity "u" of the fluid in the region of interest.

2. The method of claim 1, wherein the supplementary pressure is determined by identifying pressure gradients within the region, said region being characterized by a seismic image, said seismic image comprising a stacked time section representing horizons within said region, comprising:

a) picking a first selected horizon from said seismic image;
    b) calculating a set of instantaneous amplitudes and frequencies for said first selected horizon;
    c) determining the average amplitude and frequency of said set of instantaneous amplitudes and frequencies;

d) identifying pressure gradients associated with said instantaneous amplitudes and frequencies to generate a pressure gradient map, said pressure gradients corresponding to points at which said instantaneous amplitudes and frequencies vary from said average amplitude and frequency, wherein points at which said instantaneous amplitudes and frequencies are less than said average amplitude and frequency correspond to locations of relatively low pressure.

3. The method of claim 1 wherein said first selected horizon has associated traveltimes, and wherein said instantaneous amplitudes and frequencies are calculated by the Hillbert transformation using said traveltimes.

4. The method of claim 3 wherein said pressure gradient associated with said traveltime $dP^i(t^i_c)$ is calculated using the formula $$dP^i(t^i_c)=(A^i{}_C/A^0{}_C)^a(f^0{}_C/f^i{}_C)^2.$$

5. The method of claim 1 wherein the velocity vectors are related to the permeability "c", the viscosity "u", and the of supplementary pressure in the region of interest dP by the equation $$\vec{V}(T)=-(c/\mu)\nabla dP(T).$$

6. The method of claim 1 wherein the permeability "c" is calculated for selected values of the permeability "u" using the equation $$\nabla_A Pd = \frac{1}{2\pi}\int_S \frac{\mu_0}{c_0} q\frac{r}{r^2}dS - \frac{1}{2\pi}\nabla_A \int_S \left(\frac{c\mu_0}{c_0\mu}-1\right)\nabla_M P_d \frac{r}{r^2}dS$$

where $\nabla_A=i\partial/\partial x+j\partial/\partial y$, $\nabla_M=i\partial/\partial\zeta+j\partial/\partial\eta$, $dS=d\xi\partial\eta$, r is a scalar=$(x-\xi)i+(y-\eta)k$, $\zeta$ and $\eta$ are incremental lengths in the respective directions x any y, $$A = \frac{\mu Q}{4\pi\sqrt{c_{xx}c_{yy}}},$$

and Q is flow rate of the fluid in a portion of the region of interest.

7. The method of claim 1 wherein the permeability "c" and the viscosity "u" are obtained from geological data in the region of interest.

8. The method of claim 1 wherein the first velocity vector "$V_x$" is calculated using the equation $$V_{x(y=0)} = \frac{1}{x}\frac{Q}{2\pi}\sqrt{\frac{c_{xx}}{c_{yy}}},$$

and the second velocity vector "$V_y$" is calculated using the equation $$V_{y(x=0)} = \frac{1}{y}\frac{Q}{2\pi}\sqrt{\frac{c_{yy}}{c_{xx}}},$$

and wherein is flow rate of the fluid in a portion of the region of interest.

\* \* \* \* \*